Jan. 10, 1967  J. E. PRYOR  3,297,097
WHEELED TANDEM DISC HARROW
Filed Jan. 21, 1965  4 Sheets-Sheet 1
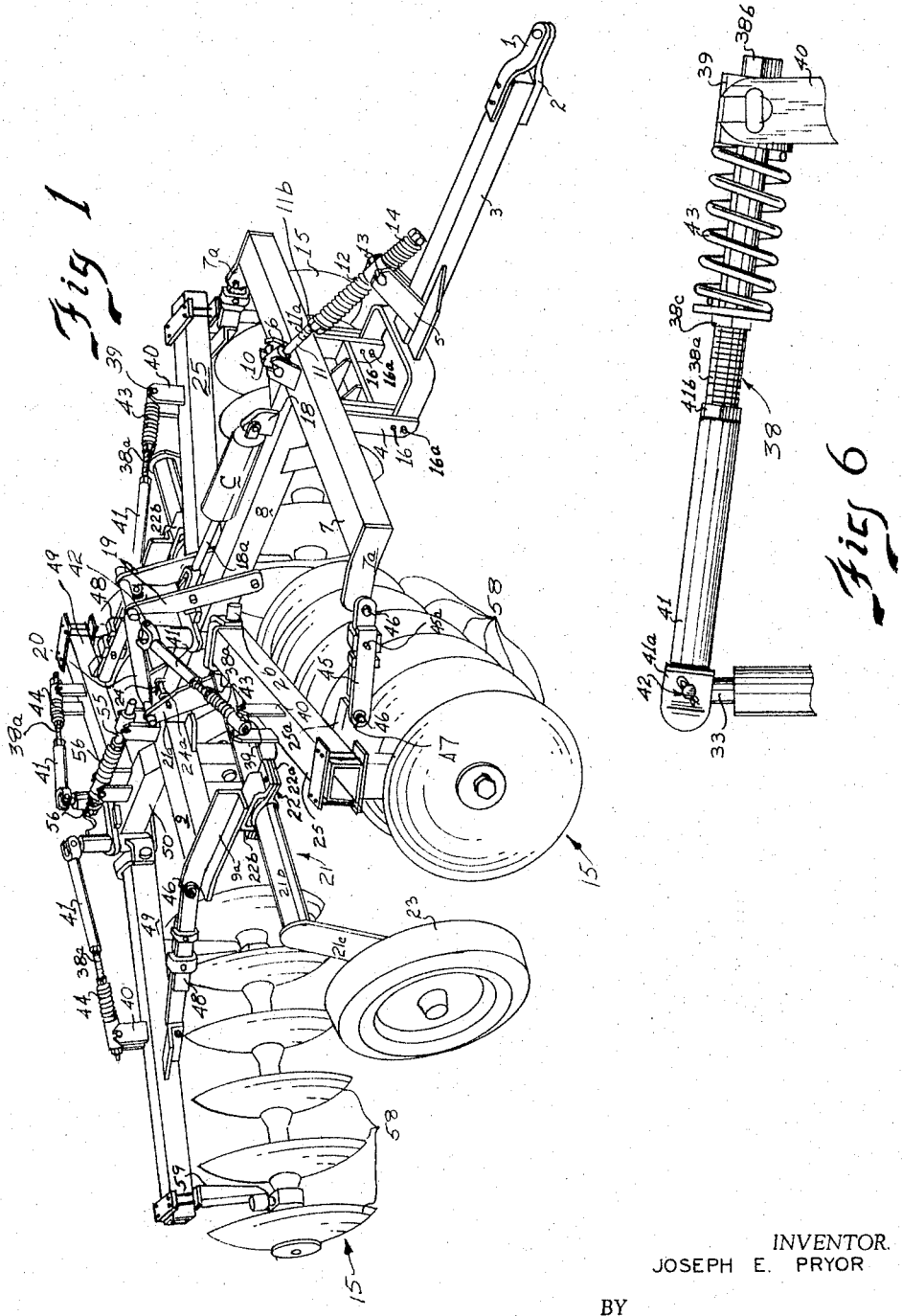
INVENTOR.
JOSEPH E. PRYOR
BY
Newton, Hopkins & Jones

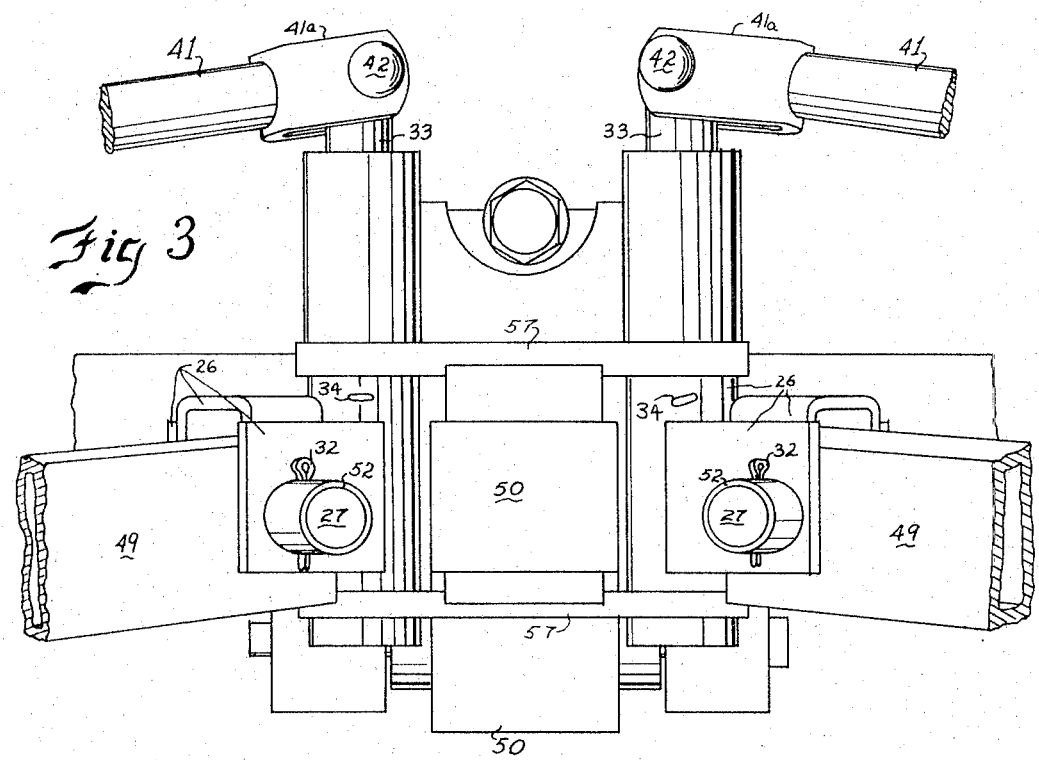
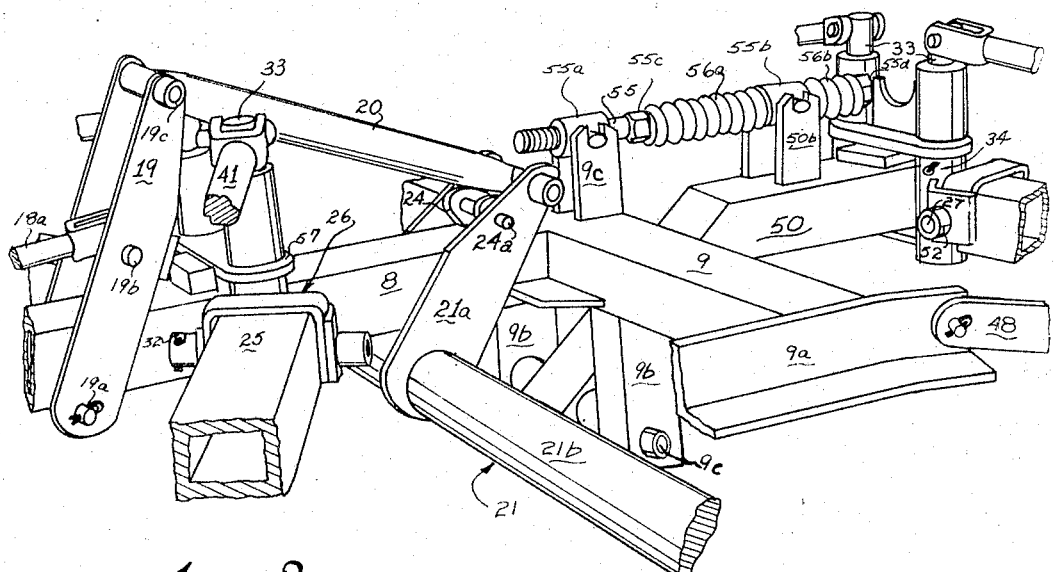

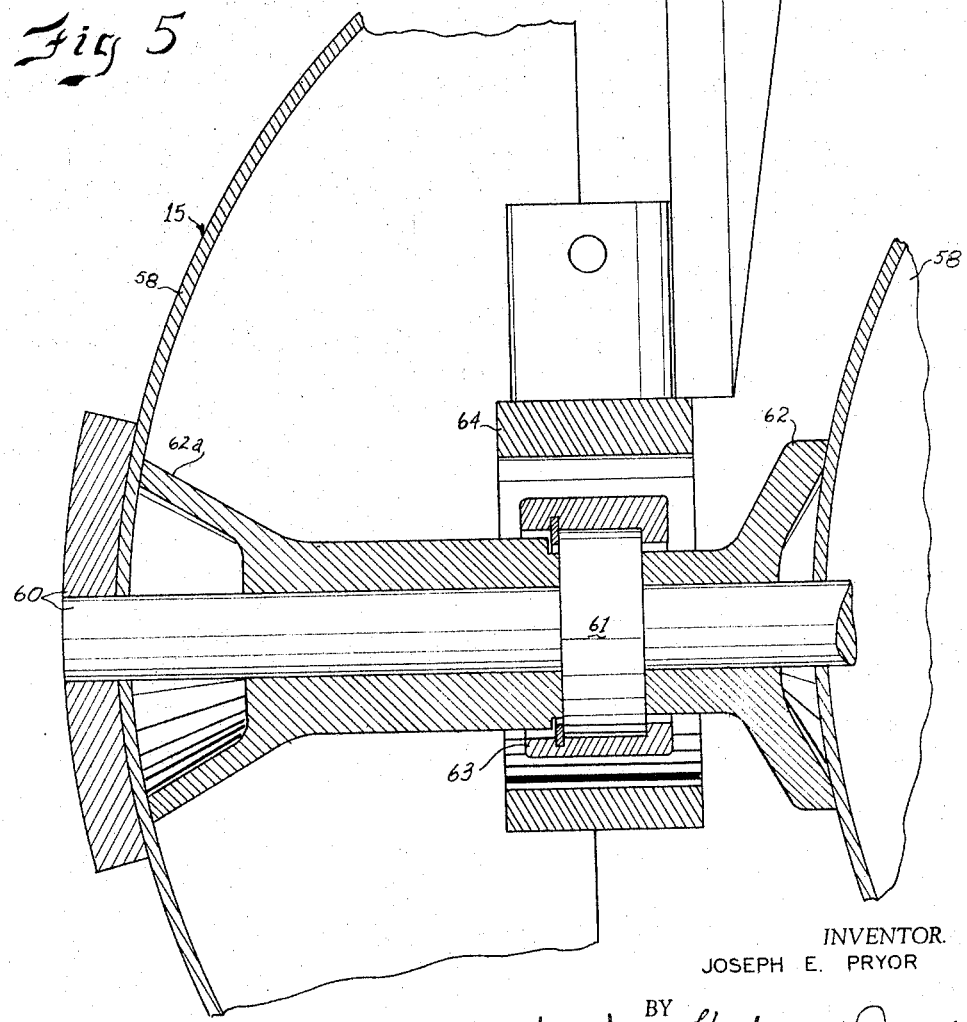

United States Patent Office 3,297,097
Patented Jan. 10, 1967

3,297,097
WHEELED TANDEM DISC HARROW
Joseph E. Pryor, Athens, Tenn., assignor to Athens Plow Company, Athens, Tenn., a corporation of Tennessee
Filed Jan. 21, 1965, Ser. No. 426,910
6 Claims. (Cl. 172—595)

This invention relates to an improved and novel disc harrow and relates particularly to a wheeled, tandem disc harrow with each disc assembly and the front and rear sections so connected that the flexibility and general performance are greatly improved over conventional disc harrows.

All previously known conventional wheeled, tandem harrows have been limited in their flexibility, or ability for one disc assembly to rise up to clear an obstruction while leaving the other free disc assemblies in contact with the soil.

Such wheeled, tandem disc harrows previously known have been so rigid that they did not properly plow uneven ground or else they failed structurally when hitting obstructions. Some wheeled, tandem disc harrows previously have provided limited flexibility through flexible, rotating, or floating frames but have been generally unsatisfactory due to the cost of operation and repair when operated in areas having stumps, levees, terraces and the like.

Accordingly, this invention involves a disc harrow of the type comprising a plurality of disc gangs, each when in operative position in the soil being capable of independent upward movement upon striking an obstruction on or in the soil, and retractable wheels mounted on the harrow for use in transporting the harrow when not in use for cultivation, the disc gangs being arranged to be lifted from the soil when the wheels are lowered to their transporting position.

It is therefore an object of this invention to provide a wheeled, tandem disc harrow so constructed that each disc assembly frame is independently mounted to a main frame in such a fashion that each disc assembly frame is free, within controlled limits, to rise upwardly to clear an obstruction without adversely affecting the cultivating job done by the other three disc frames.

Another object of this invention is to provide a wheeled, tandem disc harrow wherein the front and rear sections are attached together so that either the front or rear section may rise upward to clear an obstruction without adversely affecting the cultivating job done by the other section.

Another object of this invention is to provide simple, replaceable bushings in all wear points necessary on a flexible unit so that the disc harrow may be completely renewed at a nominal cost in these vital areas.

Another object of this invention is to provide means for adjusting and/or limiting the upward and/or downward movement of the rear section in relation to the front section.

Many other such objects of this invention that improve on existing designs of conventional tandem disc harrows will be readily obvious after referring to the drawings, specification and claims, in which:

FIG. 1 is a perspective view from a slight angle from the front of the disc harrow with an hydraulic cylinder;

FIG. 2 is a partial perspective view, with parts broken away, of the disc harrow from the side;

FIG. 3 is a partial rear elevational view of the disc harrow;

FIG. 5 is a cross-sectional view, in part, of the disc and its apparatus for mounting on the frame of the disc harrow; and FIG. 6 is an elevational view of the leveling apparatus showing its connections at each end.

Figure 4:
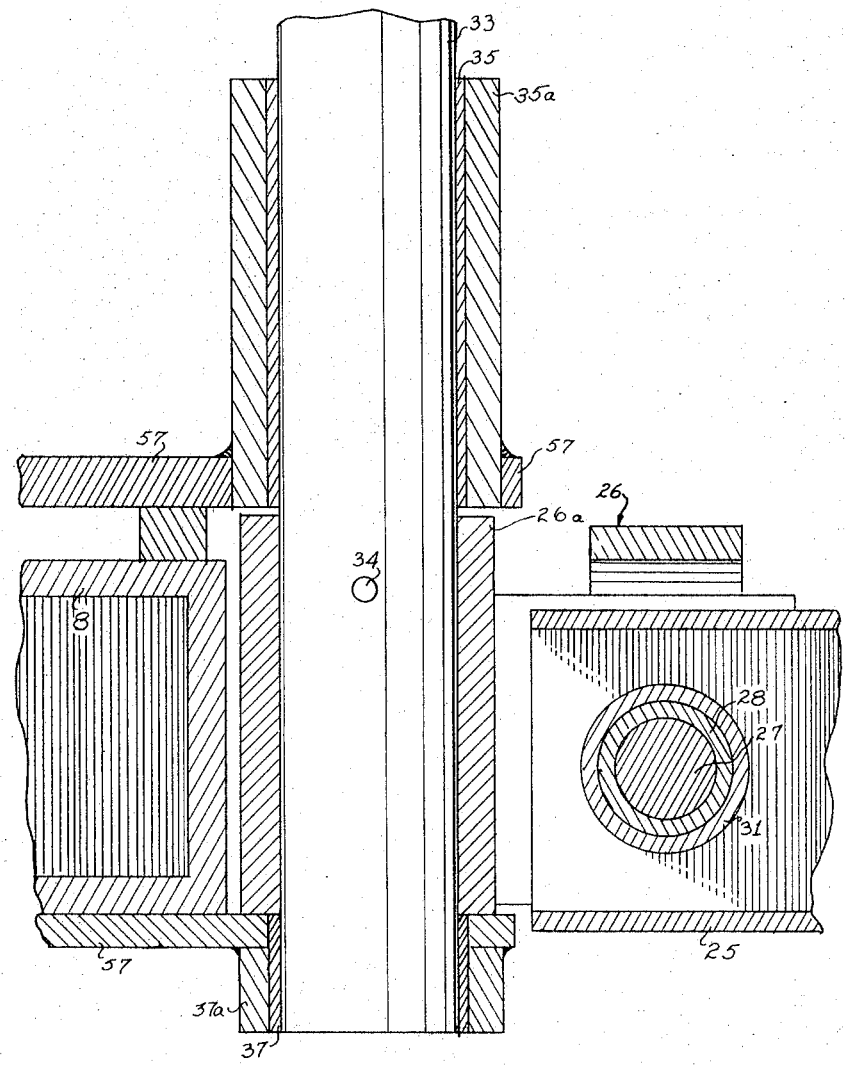
FIG. 4 is a cross-sectional view of the joint connecting the disc frame to the main frame of the disc harrow.

Referring to FIG. 1, it will be seen that this invention relates to a flexible, tandem disc harrow that is adapted to support and carry disc assemblies or gangs 15 in a tandem arrangement. The harrow is adapted to be attached to a tractor or other source of power through two tongue clevis halves 1 and 2. These clevises are so designed that they may operate satisfactorily on an agricultural drawbar, or the lower clevis half 2 may be turned over to operate satisfactorily on an industrial or split drawbar. The tongue 3 is attached pivotally to draft members 4 that are attached to the front frame member 7 of the front frame assembly 7, 8 and 9. The spring anchor 6 is attached to front frame member 7 and encloses a threaded member 10 that together with the threaded portion 11a of the leveling rod and its spring tension adjusting nut 11b fixes the adjustment of tongue leveling rod 11 in conjunction with compression desired in tongue leveling spring 12 acting against a loose trunnion 13 that is fixed in tongue leveling anchor 5. The tongue leveling spring 12 also acts as a shock absorbing member to reduce the effect of disc assemblies' 15 striking obstructions on or in the ground by partially collapsing and allowing the front frame assembly to fold downwardly until the obstruction is cleared. The shock absorbing spring 14 is mounted on the tongue leveling rod 11 in such a way that it works in conjunction with tongue leveling spring 12 to reduce and absorb shock loads due to the series of discs' 15 striking obstructions. It also reduces shock loads due to the wheels' 23 striking an obstruction when the harrow is in the transport or gauging positions. These springs 12 and 14 return to their original positions and return the tongue to its horizontal position after the obstructions are cleared by the discs or wheels. The tongue assembly 3 can be mounted at two heights in holes 16 so that it can be maintained in a level disposition with varying tractor drawbar heights. The tongue 3 is protected from wear by a hardened bushing 16a that is mounted on bolts (not shown) through holes 16 and tightened against draft members 4.

An hydraulic cylinder anchor 18 is mounted on the front center frame member 8 and a conventional hydraulic cylinder C is attached thereto. The hydraulic cylinder C is of the known type having a fluid actuated piston therein (not shown) which has a rod 18a extending through the end of the cylinder remote from the anchor 18. By changing the amount of fluid in the space between one end of the cylinder and one end of the piston the position of the piston and its rod 18a can vary. The rod 18a is attached to and arranged to move a lever assembly 19. As best seen in FIG. 2, the lever assembly 19 is a power type lever having its fulcrum at 19a, its power source at 19b and the weight at 19c. The lever assembly is composed of two spaced parallel bars mounted for rotation together on each side of the front center frame member 8 about the fulcrum 19a. A connecting tube 20 is attached at one end to the weight end 19c of the lever assembly 19 and at the other end of the wheel carriage assembly 21.

The wheel carriage assembly 21 comprises two wheel carriage assembly levers 21a, a wheel assembly support bar 21b and wheel struts 21c. The support bar 21b is connected to the lower ends of levers 21a at its midsection on each side of the front center frame member 8. The support bar 21b has wheel struts 21c connected thereto at its ends in a manner so that the struts 21c are parallel with respect to each other and are rotatable in parallel vertical planes when the wheel assembly support bar 21b is rotated.

Conventional wheel assemblies 23 are rotatably mounted on the struts 21c on the ends of the struts remote from the support bar 21b. The wheel carriage assembly 21 is rotatably mounted on the disc harrow in the pivot straps 22 which are supported by the support piece 9a of the rear frame member 9 of the front frame member. The pivot straps 22 are composed of two clamping elements 22a and a U-shaped clamp support 22b which is attached at its base to the support piece 9a and at its ends to the ends of the clamping elements 22a.

By varying the length of the hydraulic cylinder C the lever assembly 19 pivots about its fulcrum 19a to move the connecting tube 20 and pivot the wheel carriage assembly 21 about support bar 21b. Accordingly, the wheel assemblies 23 can be maintained at full down position so that the disc harrow is supported by the wheels and the disc assemblies 15 are held up off the ground; or the wheel assemblies can be positioned so that the weight of the disc harrow will force the disc assemblies 15 into the ground a predetermined amount so that the wheel assemblies will gauge the amount of penetration of the discs in the ground; or the wheel assemblies can be maintained in a full up position so that the disc assemblies 15 support the full weight of the disc harrow. Since the hydraulic cylinder C is constructed so that its piston can be positioned at any point between the ends of the cylinder, it can be seen that the wheel assemblies 23 can be positioned so as to hold or gauge the disc harrow so that it may operate at any desired depth.

When it is desirable to raise the harrow permanently, the hydraulic cylinder C is actuated until the wheel carriage assembly levers 21a are aligned with the anchor 24 which is attached to the front center frame member 8. In this position a pin 24a is inserted through the aligned holes of the anchor 24 and wheel carriage assembly levers 21a and the wheels 23 are locked in their down position.

Referring to FIGS. 1 and 2 it can be seen that the disc assembly frames 25 are attached to the center frame member 8 through universal joints or pivot cuff assemblies 26. These pivot cuff assemblies comprise horizontal and vertical pivot pins 27 and 33 respectively (FIG. 4). The horizontal pivot pin 27 is surrounded by a bushing 28 which is press fitted in the frame tube 31, and these parts are keyed together by pin 32. The vertical pivot pin 33 is mounted in a manner similar to the horizontal pin in that it is surrounded by bushings 35 and 37 which are press fitted in the frame tubes 35a and 37a. The tube 26a which supports the horizontal pin assembly surrounds the vertical pin 33 and is keyed thereto by the pin 34. The universal joints or pivot cuff assemblies 26 function so that the disc assembly frames 25 can rotate around the vertical pin 33 in a horizontal plane and around the horizontal pin 27 in a vertical plane, and the result of the combined rotations enables the disc assembly frames to move freely about the frame member 8. The particular pin and bushing construction is such that the wear on the parts will be confined to the pins and the bushings which are inexpensive and easy to replace.

The two front universal joints or pivot cuff assemblies 26 are attached to the front center frame 8 by the vertical pivot pins 33 which are confined in the front anchors 57. The front anchors 57 are fixed to the front center frame 8 and transfer, absorb, and/or balance the thrust load from disc assemblies 15, transfer draft from tractor to disc assemblies 15, and provide a leveling and transport anchor pivot point for vertical pivot pin 33. The front anchors 57 surround bushings 35 and 37 (FIG. 4) and confine wear in this area to these bushings and to vertical pivot pin 33; these parts being inexpensive and simple to replace.

The leveling rod assemblies 38 are mounted above and at a slight angular relationship to the disc assembly frames 25. As seen in FIG. 6, the rod assemblies 38 are attached at their inner ends to the leveling pins 33 at 42 in a conventional manner and at their outer ends to the leveling anchors 40 which in turn are anchored to the disc assembly frames 25. The rod assemblies 38 comprise a leveling tube 41 with a forked end 41a for attachment to the vertical pin 33. The leveling tube is hollow and has an internal threaded portion 41b at its opposite end from its forked end 41a. The threaded portion 41b of the leveling tube 41 is arranged to adjustably receive one end of a rod 38a. The rod 38a is slidably fitted through a trunnion 39, and a nut 38b is welded on the end of the rod 38a. A second nut 38c is threaded on the midpoint of the rod 38a so that a spring 43 is held between the nut 38c and a trunnion 39. The trunnion 39 is constructed to fit into the leveling anchors 40. By this construction it can be seen that without the leveling rod assemblies 38 the disc assembly frame 25 would sag to the ground when the wheels were in their down position. With the leveling rod assemblies, however, the upward movement of the frame by the relative downward positioning of the wheels causes the leveling rod 38a to slide through the trunnion 39 until the nut 38b engages the trunnion. Since the nut 38b stops the movement of the rod 38a through the trunnion 39, continued upward movement of the frame from the ground will elevate the disc assembly frames 25.

If the rod 38a is screwed far enough into the tube, the disc assembly frames 25 can be maintained in a nearly horizontal position so that the device can be easily transported from one area to another. When the rods 28a are in their normal position with respect to the leveling tube 41 the disc assembly frames 25 are maintained in an approximately horizontal position so that when the wheel assemblies 23 are in their raised positions the disc assemblies 15 will rest on or in the ground. Due to the arrangement of the leveling rod 38a and the trunnion 39 it can be seen that, when the disc assemblies encounter an obstruction during the plowing operation, the leveling rod 38a will slide through the trunnion 39 and allow the disc assembly frame 25 to rise up over the obstruction. The springs 43 tend to dampen or slow the upward direction of the disc assembly frames 25, and after the obstruction has been cleared the spring 43 will immediately force the assembly frame back toward the ground so that very little, if any, of the soil will be left unplowed.

The combined effective lengths of the elements of the leveling rod assembly 38 can be adjusted to control and adjust the relative depth of plowing from the outer discs to the inner discs by screwing the rod 38a into or out of the leveling tube 41. This adjustment feature allows the discs to penetrate the soil to a uniform depth, deeper near the center of the harrow and shallower near the outside of the harrow; or, conversely, deeper near the outside of the harrow and shallower near the inside. Also, because of this construction very accurate control may be maintained over the penetration of the disc assemblies so that nearly perfect penetration can be maintained at all times.

The operation of like components on the rear frame is like that for the front frame except that the rear leveling spring 44 must be under considerable compression to force the outer disc blades into the ground, and the leveling rod assembly 38 is under considerable compression rather than tension as on the front of the device. The rear leveling rod assemblies 38 function in a manner similar to the front leveling rod assemblies 38 in that they are adjustable to control disc assembly penetration and also can maintain the assemblies in a nearly horizontal disposition when being transported.

The disc assembly frames 25 and 49 with their disc assemblies 15 and associated parts are maintained at the desired plowing angles by the adjustable angling straps 45 and 48, respectively. The front angling straps 45 are attached to the projections 7a and 25a with hardened steel pins 46 and are adjustable in length since they comprise two metal bars that define a series of holes (not shown) that can be aligned and a pin 45a inserted therethrough. The angling straps 45 are free to rotate about the pins 46 so that the disc assembly frames are allowed to move or float upwardly over any obstructions encountered in the soil. The rear angling straps 48 are similar to and attached to the device in a manner similar to the front angling straps 45.

As best seen in FIG. 2, the rear frame member 50 is attached to the front frame assembly by the two parallel depending frame projections 9b and pivot pin 9c fitted therethrough. The rear frame member 50 is allowed to pivot vertically around the pivot pin 9c so that the rear disc assemblies can pivot to a higher or lower elevation than the front disc assemblies.

The leveling and transport rod 55 is threaded through a sleeve 55a which is pivotally attached to the rear member 9 of the front frame assembly by the anchor 9c. The other end of the rod 55 is slidably attached to the trunnion 55b which is in turn held by the rear frame anchors 50b. Springs 56a and 56b are mounted on the rod 55 on each side of the trunnion 55b and held in place by the retaining nuts 55c and 55d. The operation of the leveling and transport rod is much like the tongue leveling rod previously explained. The rear frame 50 with its two rear disc assembly frames 49 and disc assemblies 15 are transported, leveled, depth-gauged, and/or allowed to float through adjustment of length by leveling and transport rod 55. The springs 56b and 56a allow the rod 55 to slide through the trunnion 55b so that the rear frame can be elevated or depressed with respect to the front frame and the spring tension tends to maintain the front and rear frames in a predetermined relationship with each other. It can be seen that when the harrow is going over the top of a hill or over a depression in the ground the springs 56a and 56b will function to restrain the front and rear frames from "jack-knifing" and yet will allow sufficient relative movement so that the disc assemblies of both frames are in constant contact with the soil. Also, the bolt 55c can be adjusted so that the weight of the front frame is partially supported by the rear frame. In this manner the depth of soil penetration of the rear disc assemblies with respect to the front disc assemblies can be controlled to some degree so that the front disc assemblies penetrate to the same degree as the rear disc assemblies, deeper than the rear disc assemblies or shallower than the rear disc assemblies. The springs 56a and 56b function to absorb any shocks that might be transmitted from one frame to another frame. Also, when the wheels are lowered so that the device can be transported the rear frame is supported by the front frame through the leveling and transport rod 55. When the front frame is elevated by the wheels, the rear frame will tend to pivot about pivot pin 9c. This will cause the trunnion 55b to compress spring 56b toward the retaining nut 55d, which eventually will stop pivotal motion between the frames so that the front frame will pick up the rear frame. In this manner the rear frame is in a position for transport.

As best seen in FIG. 5, each disc assembly 15 is made up of: four or more disc blades 58, two or more bearing hanger assemblies 59, one or more axle assemblies 60, two or more bearings 61, half spacers 62 and 62a, with bearing housing 63, and bearing trunnions 64, and various other conventional hardware needed to assemble and attach the discs to the frames 25 and 49 in an operable manner.

The disc blades 58, mounted as above, cultivate the soil to destroy weeds, level the ground, break up clods, and generally improve the texture and tilth of the soil necessary for planting and growing field crops in a manner which is greatly improved over the previously known disc harrows.

It will be obvious to those skilled in the art that many variations may be made in the embodiments chosen for the purpose of illustrating the present invention without departing from the scope thereof as defined by the appended claims.

What is claimed as invention is:
1. A disc harrow comprising:
 (a) a main frame comprising a front frame assembly and a rear frame assembly, said front frame assembly being pivotally connected to said rear frame assembly,
 (b) a tongue connected to said front frame assembly and adapted to be attached to a source of power,
 (c) a leveling means resiliently connected between said tongue and said front frame for resiliently and adjustably positioning said tongue with respect to said front frame assembly,
 (d) a front pair of disc gangs disposed on each side of said front frame assembly,
  (1) said front pair of disc gangs each being pivotally connected at their inner ends to said front frame assembly,
  (2) adjustable angling straps connecting the outer ends of each of said front pair of disc gangs to said front frame assembly whereby said front pair of disc gangs can be adjusted in the horizontal plane with respect to said main frame,
 (e) a leveling means connected between said front frame assembly and said rear frame assembly for resiliently adjusting said front frame assembly and said rear frame assembly with respect to each other in the vertical position,
 (f) a rear pair of disc gangs disposed on each side of said rear frame assembly,
  (1) said rear pair of disc gangs each being pivotally connected at their inner ends to said rear frame assembly,
  (2) adjustable angling straps connecting the outer ends of each of said rear pair of disc gangs to said front frame assembly whereby said rear pair of disc gangs can be adjusted in the horizontal plane with respect to said main frame,
 (g) leveling rods resiliently connected between said front frame assembly and each of said front disc gangs and between said rear frame assembly and each of said rear disc gangs whereby each disc gang is permitted to be independently raised or lowered with respect to each other,
 (h) a wheel carriage assembly connected to said main frame and adapted to transport said disc harrow, and
 (i) hydraulic means connected between said main frame assembly and said wheel carriage assembly and adapted to raise and lower said wheel carriage assembly with respect to said main frame assembly.
2. A disc harrow comprising:
 (a) a main frame having a hitch means,
 (b) a plurality of pairs of disc gangs disposed on said main frame wherein the disc gangs of each pair are disposed on opposite sides of said main frame,
 (c) means for connecting each disc gang to said main frame, said means comprising:
  (1) a pivot cuff,
  (2) a vertical pin pivotally connecting said pivot cuff to said main frame for pivotal movement in a horizontal plane,
  (3) and a horizontal pin pivotally connecting the inner end of said disc gang to said pivot cuff for pivotal movement in a vertical plane,
 (d) leveling means for each disc gang, said means comprising a rod resiliently connected between said vertical pin of said means for connecting the disc gang to the main frame and said disc gang,
 (e) and adjustable angling straps connected between each disc gang and the main frame whereby said disc gangs may be adjusted in the horizontal plane with respect to said main frame.

3. A disc harrow according to claim 2 wherein the main frame comprises a front frame assembly and a rear frame assembly with at least one pair of disc gangs disposed on each assembly, said front frame assembly being pivotally connected to said rear frame assembly, and a leveling means connected between said front frame assembly and said rear frame assembly for resiliently adjusting said front frame assembly and said rear frame assembly with respect to each other in the vertical position.

4. A disc harrow according to claim 2 wherein the hitch means comprises a tongue connected to the front of said main frame and adapted to be attached to a source of power and leveling means resiliently connected between said tongue and said main frame for resiliently positioning said tongue with respect to said main frame.

5. A disc harrow according to claim 4 wherein a wheel carriage assembly is connected to said main frame and adapted to transport said disc harrow and hydraulic means are provided between said wheel carriage assembly and said main frame for raising and lowering said wheel carriage assembly with respect to said main frame.

6. A disc harrow according to claim 2 wherein the leveling means of each disc gang comprises a rod having a body portion and an extension portion, said extension portion being threadedly received in said body portion whereby the length of said rod may be adjusted, anchoring means secured to said disc gang, said body portion of said rod being pivotally connected to said vertical pin, said extension portion of said rod being slidably received in said anchoring means and having stop means secured to its end to maintain it in communication with said anchoring means, and a resilient spring concentrically surrounding said extension portion and being biased against said body portion and said anchoring means.

References Cited by the Examiner

UNITED STATES PATENTS

| | | | |
|---|---|---|---|
| Re. 22,627 | 4/1945 | McKay | 172—441 |
| Re. 23,190 | 1/1950 | Smith | 37—153 |
| 443,793 | 12/1890 | Ritchie | 172—591 |
| 1,412,721 | 4/1922 | Thomas | 172—593 X |
| 2,960,171 | 11/1960 | Gehler et al. | 172—595 X |
| 2,985,247 | 5/1961 | Gehler et al. | 172—456 |
| 3,014,540 | 12/1961 | Youngberg | 172—498 X |
| 3,181,621 | 5/1965 | Mortashed | 172—595 X |

FOREIGN PATENTS 589,641  12/1959  Canada.

ABRAHAM G. STONE, *Primary Examiner.*

J. R. OAKS, *Assistant Examiner.*